(12) United States Patent
Grace

(10) Patent No.: US 9,551,430 B2
(45) Date of Patent: Jan. 24, 2017

(54) FLAT-FACE VALVE FOR PULP ROTARY DRUM VACUUM WASHER FILTER AND METHOD

(71) Applicant: Andritz Inc., Glens Falls, NY (US)

(72) Inventor: Todd Grace, Alpharetta, GA (US)

(73) Assignee: Andritz Inc., Glens Falls, NY (US)

( * ) Notice: Subject to any disclaimer, the term of this patent is extended or adjusted under 35 U.S.C. 154(b) by 20 days.

(21) Appl. No.: 14/428,042

(22) PCT Filed: Oct. 1, 2013

(86) PCT No.: PCT/US2013/062856
§ 371 (c)(1),
(2) Date: Mar. 13, 2015

(87) PCT Pub. No.: WO2014/055509
PCT Pub. Date: Apr. 10, 2014

(65) Prior Publication Data
US 2015/0292639 A1    Oct. 15, 2015

Related U.S. Application Data

(60) Provisional application No. 61/708,259, filed on Oct. 1, 2012.

(51) Int. Cl.
*F16K 24/04* (2006.01)
*B01D 33/74* (2006.01)
(Continued)

(52) U.S. Cl.
CPC ............... *F16K 24/04* (2013.01); *B01D 33/06* (2013.01); *B01D 33/09* (2013.01); *B01D 33/48* (2013.01);
(Continued)

(58) Field of Classification Search
CPC ......... F16K 24/04; B01D 33/48; B01D 33/06; B01D 33/74; B01D 36/001; B01D 33/09; B01D 33/0009; D21C 9/06
See application file for complete search history.

(56) References Cited

U.S. PATENT DOCUMENTS 1,558,038 A * 10/1925 Mount .................. B01D 33/09
                                                                          210/393
2,899,068 A *  8/1959 King ................. B01D 33/0009
                                                                          210/390
(Continued)

*Primary Examiner* — David C Mellon
*Assistant Examiner* — Liam Royce
(74) *Attorney, Agent, or Firm* — Kerri Hochgesang; Robert Joseph Hornung

(57) ABSTRACT

A rotary drum for thickening pulp from a slurry, the drum including drainage channels delivering filtrate from a pulp mat on an outer surface of the rotary drum to at least one filtrate chamber at an end of the rotary drum, a flat face valve and plenum chamber assembly in the filtrate chamber. The flat face valve juxtaposed against drainage outlets of the drainage channels, wherein the flat face valve does not block the drainage outlets during a majority of the rotation of the rotary drum. At least one opening on the flat face valve extending through the front surface and aligned with the drainage outlets to provide a fluid passage through the flat face valve and to a plenum chamber behind the flat face valve such that air in the filtrate is collected in the upper portion of the plenum chamber and removed from the rotary drum.

6 Claims, 4 Drawing Sheets

(51) Int. Cl.
*B01D 33/48* (2006.01)
*B01D 33/06* (2006.01)
*B01D 36/00* (2006.01)
*B01D 33/09* (2006.01)
*B01D 33/00* (2006.01)
*D21C 9/06* (2006.01)

(52) U.S. Cl.
CPC ............. *B01D 33/74* (2013.01); *B01D 36/001* (2013.01); *B01D 33/0009* (2013.01); *D21C 9/06* (2013.01)

(56) References Cited

U.S. PATENT DOCUMENTS

| | | | | |
|---|---|---|---|---|
| 3,823,830 | A * | 7/1974 | Hayafune | B01D 33/09 210/330 |
| 5,674,396 | A * | 10/1997 | Wenzl | B01D 33/09 210/324 |
| 2008/0156747 | A1 * | 7/2008 | Grace | B01D 33/073 210/808 |
| 2010/0314062 | A1 * | 12/2010 | Grace | D21C 9/18 162/217 |

* cited by examiner

FLAT-FACE VALVE FOR PULP ROTARY DRUM VACUUM WASHER FILTER AND METHOD

RELATED APPLICATION

This invention claims the benefit of U.S. provisional patent application No. 61/708,259, filed on Oct. 1, 2012 and PCT international application no. PCT/US2013/062.856, filed on Oct. 1, 2013. The entirety of each of the above-identified priority patent applications is incorporated herein by reference.

BACKGROUND OF THE INVENTION

The field of the invention generally relates to rotary drum vacuum washer filters for washing pulp and increasing the consistency (dewatering) of pulp in the pulp and paper industry, and for washing and dewatering suspensions of solids and liquids on other industries (such as but not limited to wastewater treatment, food processing, cement production and mining). In particular, the invention relates to a filtrate suction control valve for rotary drum vacuum washer filters.

Pulp is typically formed of wood chips or other cellulosic material. The pulp has been processed to separate the fibers in the cellulosic material. The pulp flows in a slurry. The rotary drum vacuum washer filter separates the pulp from the liquor in the slurry. The rotary drum vacuum washer filter is also referred to as a filter because it removes liquor and wash liquid from the pulp.

The removed liquor and wash liquid drain into a filtrate chamber at the end of the rotary drum and flow down a drop leg conduit. The downward flow of liquor and wash liquid create a suction that draws the liquor and wash liquid through the pulp mat and porous surface of the rotary drum.

The suction may be disrupted if excessive air or other gases are in the drop leg conduit. Air and gases fill the drainage channels of the rotary drum during a portion of the rotation of the drum. To prevent the air and gases in the drainage channels from entering the filtrate chamber and drop leg conduit, a valve is typically used to block the drainage channels while they are filled with air and gases. One type of conventional valve is mounted on a stem extending through a trunnion supporting an end of the rotary drum, as is shown in U.S. Pat. No. 7,981,248. Another type of valve is the conventional flat-face valve plate (no openings in the plate) that blocks the outlets to the drain channels during the portion of their rotation when the drain channels have large amounts of air or other gases.

To maintain high levels of suction in the rotary drum, air and gases should not flow into, or at least not become excessive in the filtrate chamber, elbow or drop leg conduit. A difficulty with the conventional flat-face valve plate is that air and other gases captured in the drain channels are released into the filtrate chamber as the drain channels pass the flat-face valve plate.

BRIEF DESCRIPTION OF THE INVENTION

A flat-face valve has been conceived for a rotary drum vacuum washer filter. The flat-face valve vents gas or air from drainage channels in the washer filter to a plenum chamber. The flat-face valve reduces the amount gas or air entering the filtrate chamber and drop leg conduit of the vacuum washer filer.

The flat-face includes a plate seat and a plenum chamber adjacent the back of the plate seat. Openings in the plate seat allow air or other gases and filtrate from the drainage channels to enter the plenum chamber. An upper gas vent connected the plenum chamber vents air and other gases from the plenum chamber. A lower liquid drain allows filtrate liquids to drain from the plenum chamber.

A rotary drum has been conceived that includes drainage channels delivering filtrate from a pulp mat on an outer surface of the rotary drum to a filtrate chamber at an end of the rotary drum vacuum washer filter. A flat-face valve is mounted to the housing for the rotary drum and is proximate to the filtrate chamber. The flat-face valve prevents air and other gasses from entering the filtrate chamber and the drop-leg conduit that drains the filtrate chamber. The flat-face valve also vents air and other gases captured in the drainage channels of the rotary drum before the captured air and gases can enter the filtrate chamber.

The stationary flat-face valve may include: a plate seat having a front surface juxtaposed against filtrate drainage outlets of the rotary drum, wherein the plate seat does not block the drainage outlets during a majority of the rotation of the rotary drum; a plenum chamber adjacent a backside of the plate seat; a mounting bracket extending towards a stationary housing of the rotary drum washer filter, wherein the mounting bracket is configured to be fixed to the stationary housing of the rotary drum washer filter and position the front surface of the plate seat in juxtaposition to the drainage outlets; at least one opening on the plate seat extending aligned with the drainage outlets, said drainage opening providing a passage through which air, gases and filtrate from the drainage channel enters the plenum chamber behind the plate seat; and a gas vent at an upper portion of the plenum chamber. The flat-face valve plate may be configured to be aligned with the 12:30 to 4:30 rotational positions of the drainage outlets.

The plenum chamber may be a crescent shaped box attached to the back of the plate seat. The gas vent extends from an upper region of the plenum chamber to an external outlet of the rotary drum, and a liquid drain extends from a lower region of the plenum chamber to a liquid collection device, such as a filtrate tank.

A rotary drum vacuum washer filter has been conceived comprising: a housing including a vat configured to receive a slurry of a liquid and a fibrous cellulosic material; a rotating drum including a porous outer surface and drainage channels extending from the outer surfaces to an end of the drum, wherein the rotating drum sits within the vat and the drainage channels are arranged in an annular array and include outlets forming an annular array proximate the end of the drum; a stationary filtrate chamber adjacent the end of the drum and facing the annular array of outlets, and a stationary flat face valve at least partially within the filtrate chamber, the flat face valve comprising: plate seat including a front surface configured to be adjacent the outlets of the drainage channels, wherein the plate seat covers the drainage outlets during a portion of the rotation of the outlets and does not cover the drainage outlets during a majority of their rotation; an opening on the plate seat extending through the front surface and aligned with the drainage outlets; a plenum chamber adjacent a back surface of the plate seat, wherein the opening provides a fluid passage from the drainage outlets, through the plate seat and into the plenum chamber, and a gas vent extending from an upper region of the plenum chamber to an external outlet.

A method of dewatering pulp has been conceived including: forming a pulp mat on a porous surface of a rotary drum having a lower drum portion in a vat of pulp slurry; drawing filtrate through the pulp mat and the porous surface, through drainage channels in an annular array of drainage channels within the drum, into a filtrate chamber at an end of the drum, through a drop leg conduit and down to a filtrate tank below the vat, wherein the flow of the filtrate through the drainage channels, the filtrate chamber and the drop leg creates a suction at the porous surfaces that draws the filtrate through the pulp mat; covering outlets to the drainage channels with a flat plate seat to occlude the flow of filtrate and gases from the drainage channels to the filtrate channel during a period of the rotation during which the drainage channels have substantial amounts of gases, while opening the outlets during a majority of the rotation; during the covering of the outlets, directing the filtrate and gases from the drainage channels into a plenum chamber on a side of the flat plate seat opposite to the outlets; venting gases in the plenum chamber, and draining liquids in the plenum chamber.

A method has been conceived for dewatering pulp including the formation of a pulp mat on a screened surface of a rotating drum having a lower drum portion in a vat of pulp slurry and drainage channels draining filtrate passing through the porous surface to a filtrate chamber at an end of the rotary drum, the method comprising: as the porous surface of the rotary drum rotates through vat, a pulp mat forms on the porous surface due to suction applied to the porous surface; draining the filtrate from the drainage channels into the filtrate chamber and to a drop leg conduit extending below the vat; applying a wash liquid to the pulp mat after the porous surface rotates up and out the vat, wherein the wash liquid flows through the pulp mat and porous surface into the drainage channels; draining the filtrate flowing through the drainage channels into a drop leg conduit; as the porous surface rotates down towards the vat, moving the pulp mat away from the application of the wash liquid; removing the pulp mat from the porous surface before the porous surface rotates down into the vat; for the drainage channels associated with a portion of the porous surface not receiving the application of the wash liquid, diverting the flow of filtrate and gases from the filtrate channels through openings in a plate seat and into a plenum chamber, and venting gases from the plenum chamber away from the filtrate chamber and the drop leg.

The diversion of the flow of the filtrate occurs in a range of the 2:00 to 5:30 rotational positions of the rotary drum. The plate seat and plenum chamber may be in a flat valve within the filtrate chamber or attached to a filtrate chamber.

These features, and other features and advantages of the present invention will become more apparent to those of ordinary skill in the art when the following detailed description of the preferred embodiment is read in conjunction with the appended figures.

DETAILED DESCRIPTION OF THE INVENTION

The foregoing detailed description of the preferred embodiments is presented only for illustrative and is not intended to be exhaustive or to limit the scope and spirit of the invention. The embodiments were selected and described to best explain the principles of the invention and its practical applications. One of ordinary skill in the art will recognize many variations can be made to the invention disclosed in this specification without departing from the scope and spirit of the invention.

Figure 1:
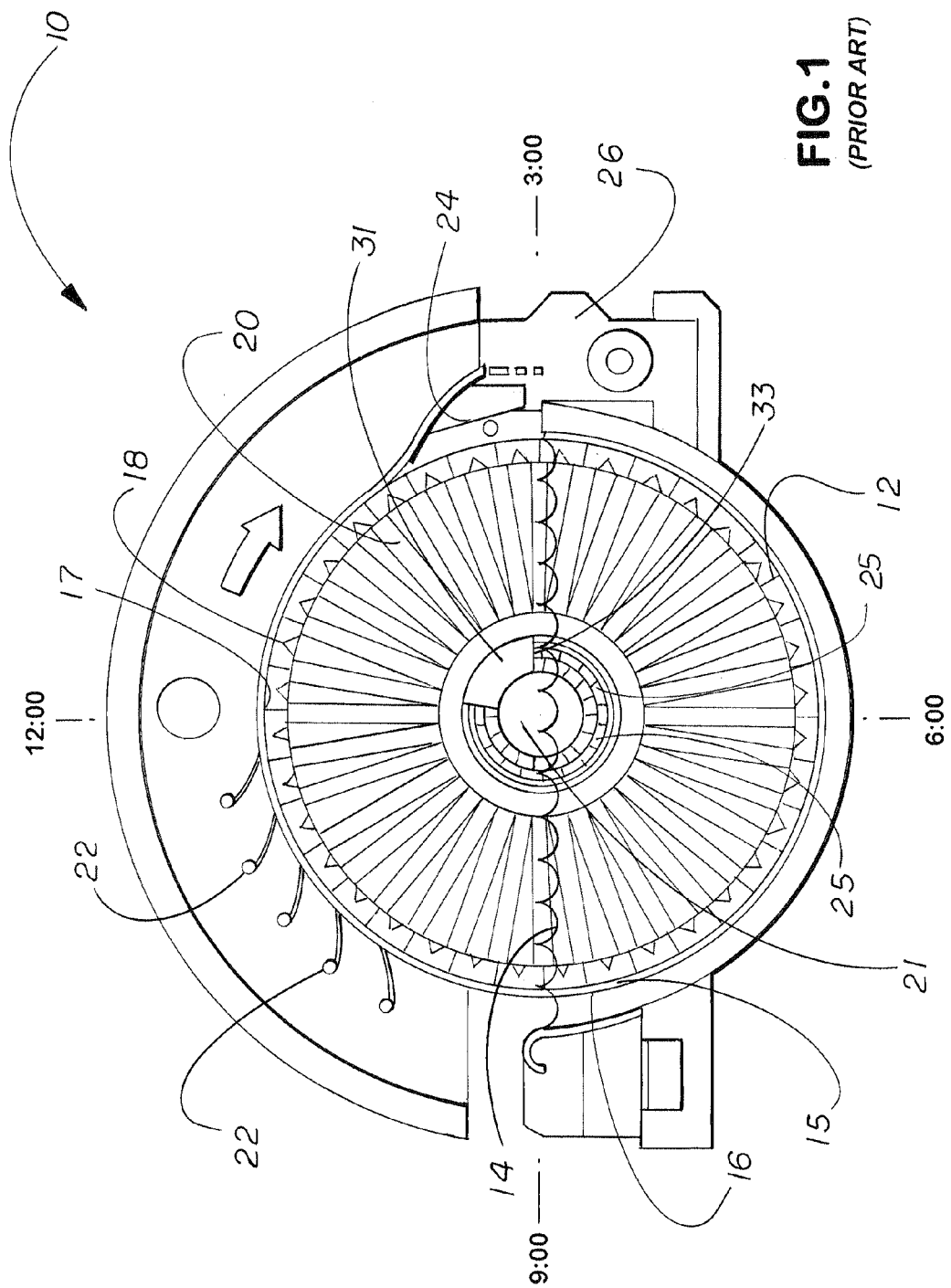
FIG. 1 is a schematic diagram of an end of a rotary vacuum drum washer filter wherein the end of the housing is open to expose the rotary drum, vat and other interior components of the rotary vacuum drum washer filter.

FIG. 1 shows a conventional rotary drum vacuum washer filter 10 that includes a rotary drum 12 in a vat (illustrated by an upper surface of the pulp slurry in the vat) of pulp slurry. The rotary drum 12 turns in a clock-wise direction at an exemplary rate of approximately 2 to 4 revolutions per minute (RPM), such as 3 RPM. The rotary drum 12 is partially submerged in the vat 14, such as up to the horizontal centerline of the rotary drum 12. As the rotary drum 12 rotates through the slurry (3:00 to 9:00 positions) in the vat 14, a pulp mat 15, also referred to as a "cake", forms on the screened surface 16 of the rotary drum 12. The screened surface is porous such that filtrate and other liquids can flow through the surface to the longitudinal drainage channels 18

The screened surface 16 and deck 17 form a cylindrical sheath over the longitudinal drainage channels 18 of the rotary drum 12. The longitudinal drainage channels 18 may extend the length of the rotary drum 12 and are parallel to the axis of the rotary drum 12. The screened surface 16 may be formed of a metal or plastic mesh material that covers a deck 17 of the rotary drum 12. The deck 17 may be a wire structure, a perforated plate or corrugated plate. The pulp mat 15 and screened surface 16 form a filter that prevents the passage of pulp fibers and allows the passage of water, liquor and other liquids. The water, liquor and other liquids passing through the pulp mat 15 become filtrate which collects in longitudinal drainage channels 18 under the deck 17 and flow through an annular array of drainage channels 20 to a filtrate chamber 21 that may be at the end of the rotary drum 12.

The pulp slurry in the vat 14 typically has a low consistency, such as 1.5% pulp and 98.5% liquid by weight. The pulp is drawn from the vat 14 to the pulp mat on the cylindrical screened surface 16. As the pulp mat 15 and screened surface 16 rise out of the vat 14, the pulp mat 15 has a consistency of about 10% pulp and 90% liquid. After rising out of the vat 14, the pulp mat 15 is washed by water spray nozzles 22 that are typically spraying water on the pulp mat 15 as the pulp mat 15 and screened surface 16 rotate through the 9:00 to 12:00 positions of the rotary drum 12.

Suction draws liquids through the pulp mat 15 and screened surface 16. The suction causes the pulp mat to form as the screened surface rotates through the vat 14. Similarly, suction draws the wash water from the spray nozzles 22 through the pulp mat and screened surface, and into longitudinal drainage channels 18 below the screened surface 16.

As the screened surface 16 passes over the top rotational position (12:00), the pulp mat 15 moves beyond the wash water spray from the nozzles 22. As the pulp mat and screened surface 16 rotate through the 1:00 to 2:00 position, a scraper 24 removes the pulp from the screened surface 16. When removed, the pulp may have a consistency of 12% cellulosic material or greater. The removed pulp is collected in a pulp collection chamber 26 for further processing.

The suction is released as the screened surface rotates through the 12:00 to the 3:00 positions. The suction is released to allow the scraper to remove the pulp mat. The suction is also released to minimize the amount of air and other gases that are drawn into the drain channels and associated drainage channels while no wash water or other liquids are applied to the screened surface.

As the screened surface 16 rotates past the 3:00 position, the screened surface 16 re-enters the vat 14. Suction is reapplied to the screened surface typically at about 155 degrees (about 5:15 position) past the top rotational position (12:00), to the longitudinal channels 18. The process repeats as the screened surface 16 passes through the vat 14 as the rotary drum 12 rotates.

Figure 2:
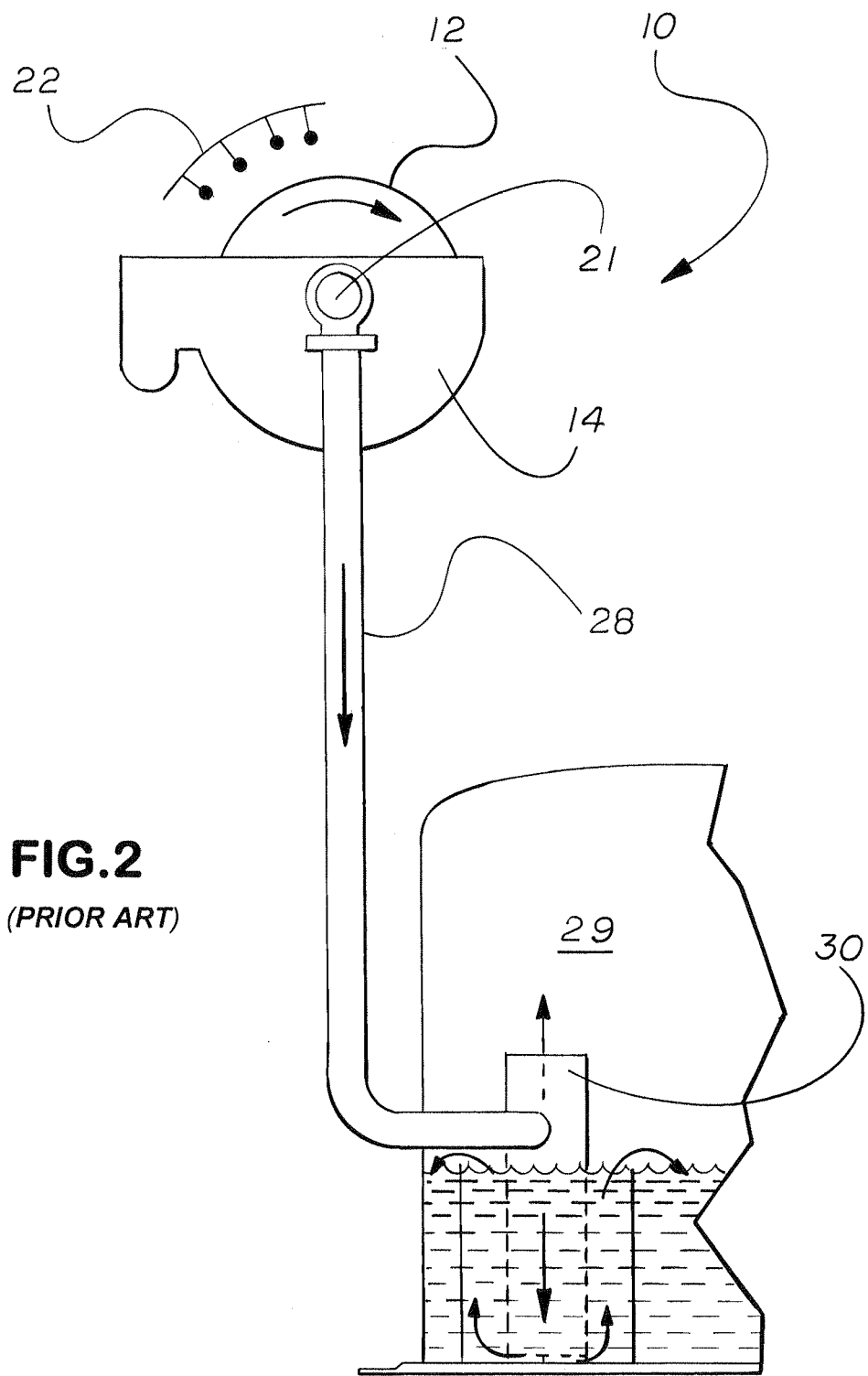
FIG. 2 is a schematic diagram of a drop leg conduit configuration for the rotary vacuum drum washer filter shown in FIG. 1.

FIG. 2 schematically illustrates a conventional drop leg 28 for a rotary drum vacuum washer filter 10. The motive force for the suction applied to the screened surface 16 is a vacuum created by the flow of liquid filtrate through the drainage channels 18, 20 and down through a drop leg conduit 28 and to a sealed filtrate collection tank 29 (FIG. 2). The tank 29 may be approximately 30 feet (ft.) to 40 ft below the vat 14. The drop leg 28 is a conduit for the filtrate discharged from the rotary drum vacuum washer filter 10. Within the sealed filtrate collection tank 29 (FIG. 2 shows one-half of the chamber) may be an anti-foaming device 30 to separate gas and liquid from the fluid from the drop leg 28.

To maintain high levels of suction, excessive amounts of air and other gases should not flow into the drop leg 28. The presence of air in the drop leg 28 creates a proportional decrease in the suction (vacuum) applied the drainage channels 18, 20. If too much air or other gases enter the drop leg 28, the flow of liquid filtrate into the drop leg conduit 18 may be interrupted and result in reduced suction applied through the drainage channels 18, 20 to draw filtrate liquid through the pulp mat 15 and screened surface 16.

Air enters the longitudinal drainage channels 18 and drainage channels 20 as the screened surface 16 rotates from just over the top position (12:00) to the vat 14 (3:00 to 4:00). During this portion of the rotation, the pulp mat and screened surface are not covered with a liquid from the spray nozzles 22 or the vat 14. To prevent air from entering the filtrate chamber and the drop leg 28, a conventional flat-face valve plate 31 blocks the outlets 25 of the drainage channels 20. For the portion of the rotation of the rotary drum 12 corresponding to the 12:30 to 5:30 positions, the conventional flat-face valve plate 31 blocks the outlets to the drainage channels 20 to air and other gases from entering the drop leg conduit 28. As the outlets 25 rotate beyond the trailing edge 33 of the conventional flat-face valve plate 31, air and other gases trapped in the drainage channels 18, 20 flow into the filtrate chamber 21 and the drop leg conduit 28.

Figure 3:
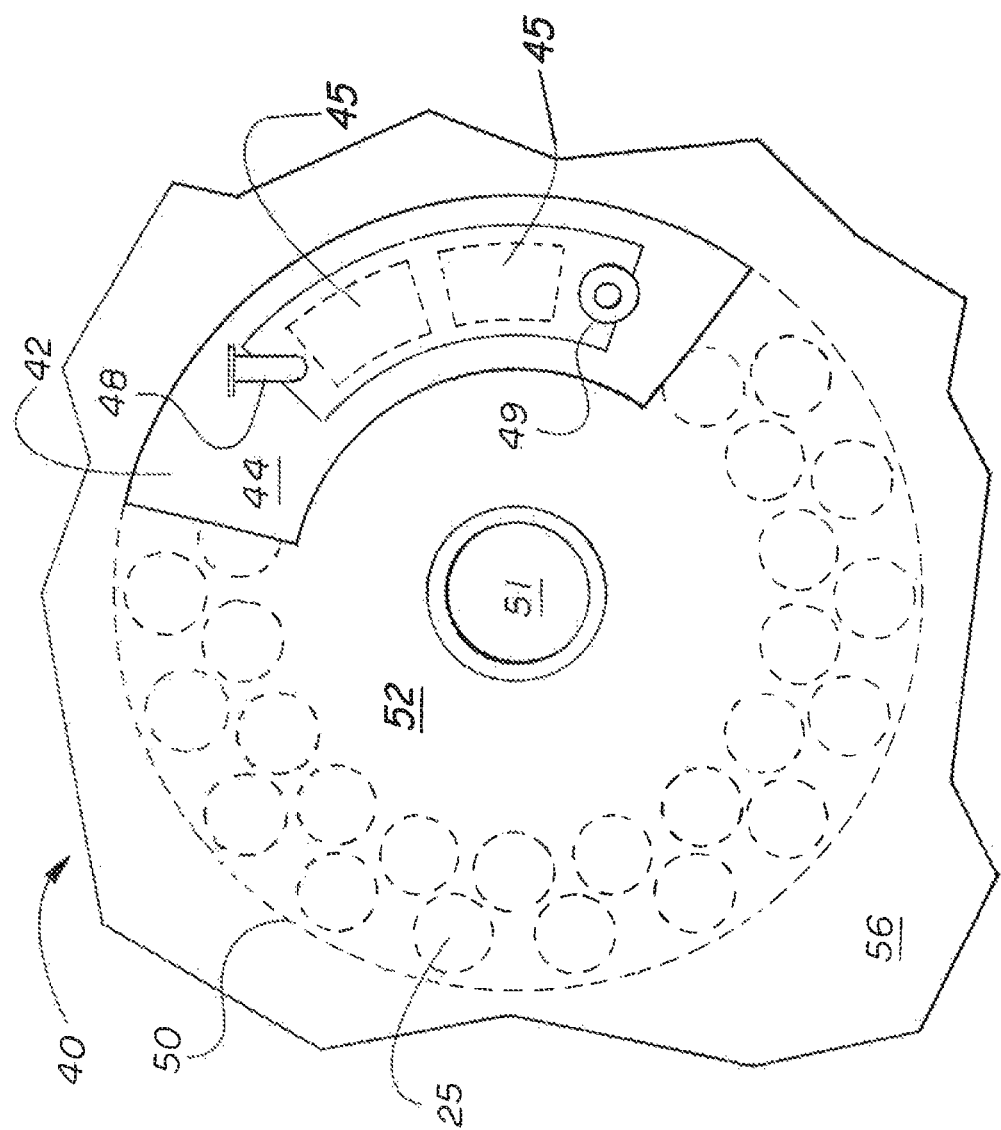
FIG. 3 is a schematic diagram showing a portion of an end of a rotary vacuum washer filter having a novel flat-face valve.

FIG. 3 is a cross-sectional view of a portion of the end of vacuum washer rotary drum 40 similar in most respects to the rotary drum vacuum washer filter 10 shown in FIG. 1, but including a flat-face valve 42 that includes a plate seat 44 and a plenum chamber 45.

The flat-face valve 42 is stationary and may be mounted to the housing for drum. The front of the plate seat 44 is immediately adjacent and covers the outlets 25 to the drainage channels as the outlets rotate through, for example, the 12:30 to 5:30 positions. The plenum chamber 45 is on the back side of the plate seat 44. The plenum chamber 45 receives filtrate, air and other gases that flow through openings 47 in the plate seat 44. The openings 47 are shown in dotted lines because the openings are covered by the plenum chamber 45. The plenum chamber 45 has a gas vent 48 and a liquid drain 49. The gas vent 45 may discharge the gases to a cyclone or other device to remove liquid and particulates from the gases. The liquid drain may connect to a conduit to the filtrate collection tank (FIG. 2). The conduit may be separate from the drop leg conduit.

The plate seat 44 may have a planar front surface and have a perimeter in the shape of an arc. The shape of the plate seat corresponds to the portion of the outlets 25 to be covered by the valve 42. The plate seat 44 may be configured to cover the outlets 20 as they move through angular positions of the drum from 1:00 to 2:00 to 4:00 to 5:30, as is conventional for a flat face valve. For example, the plate seat may block the outlets 20 as they rotate from the 12:30 to 5:30 positions, which correspond to the rotary drum 12 turning from about 12 degrees past top dead center (TDC—the 12:00 position) to 155 degrees from TDC.

The outlets 25 of the drainage channels 20 (FIG. 1) connect to a tube sheet 50 at the end of the vacuum washer rotary drum 40. The tube sheet 50 may be a metal plate having a circular perimeter and a center opening for the center shaft 51 of the vacuum washer rotary drum. The shaft 51 may be supported by trunnion bearings in a conventional manner. The tube sheet 50 has openings for each of the outlets 25 and may support the ends of the drainage channels 20. The tube sheet 50 may be in the same plane as the end surface 52 of the vacuum washer drum. Alternatively, the tube sheet 50 may be recessed or protruding from the end surface 52 of the vacuum washer drum.

The plenum chamber 45 may be an elongated chamber or an arc-shaped box formed between the back panel 54 and the plate seat 44. The inlet to the plenum chamber is formed by the openings 47 in the plate seat 44. Air and other gases enter the plenum chamber along with filtrate and other liquids. The air and other gases rise to the top of the plenum chamber and exhaust through the upper gas vent 48. Filtrate and other liquids settle in the bottom of the plenum chamber 45 and drain through the lower liquid drain 49. The gas vent 48 and liquid drain 49 may extend through the vat wall. A resilient annular coupling 78 may connect the vent or drain to conduits for the vented gases or the drained liquids.

The narrow filtrate channel 68 is formed between the tube sheet 50 (shown in dotted lines in FIG. 3) and the wall of the housing, such as the vat wall 56. The narrow filtrate channel 68 direct filtrate liquids from the outlets 25 of the drainage channels to a filtrate chamber 21 below the narrow filtrate channel 68. The narrow filtrate channel may have a depth between the tube sheet and vat wall of ten to 12 (10-12) inches (254 mm to 308 mm).

The flat face valve 42 may be entirely contained within the narrow filtrate channel 68. The flat face valve may be entirely in the narrow filtrate channel 68 to avoid having to create seals between the flat face valve and the vat wall 56 to prevent air leakage into the narrow filtrate channel 68. A difficulty with containing the flat face valve within the narrow filtrate channel 68 is the depth of the plenum chamber 45 is constricted by the depth of the narrow filtrate channel 68. The plenum chamber 45 may have an internal depth of four to five (4-5) inches (100 mm to 127 mm).

The plenum chamber should have sufficient interior volume to provide a passage for the air and other gases, and filtrate that flow through the openings 47 in the plate seat 44. Further, the internal volume of the plenum chamber should be sufficient to allow air and gas to separate from the filtrate. To provide sufficient internal volume and in view of the depth constraint, the plenum chamber may have an elongated arc-shaped length and an extended width. For example, the width or length of the plenum chamber may be greater than that needed to cover the openings 25 on the tube sheet.

Figure 4:
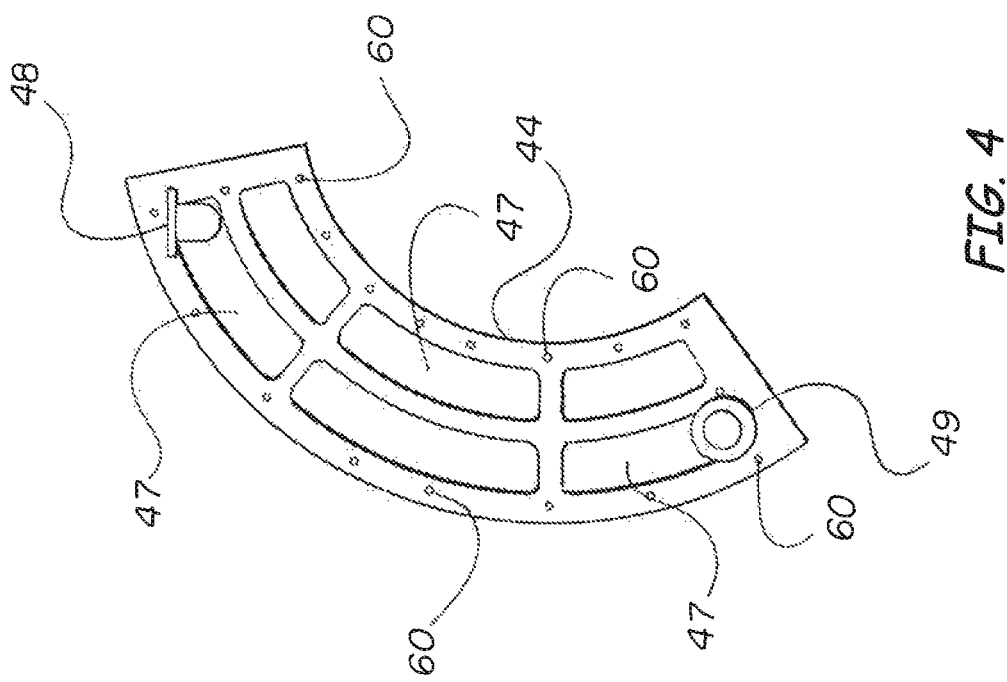
FIG. 4 is a front view of the plate seat of the flat-face valve plate.

FIG. 4 is a front view of the plate seat 44 which shows the openings 47 for air and filtrate. The openings 47 may be arranged in arc-shaped rows to align with corresponding annular rows of the outlets 25 of the drainage channels. The upper gas vent 48 and lower liquid drain 49 are shown for purposes of illustration in FIG. 4 and need not be physically attached to plate sheet.

Figure 5:
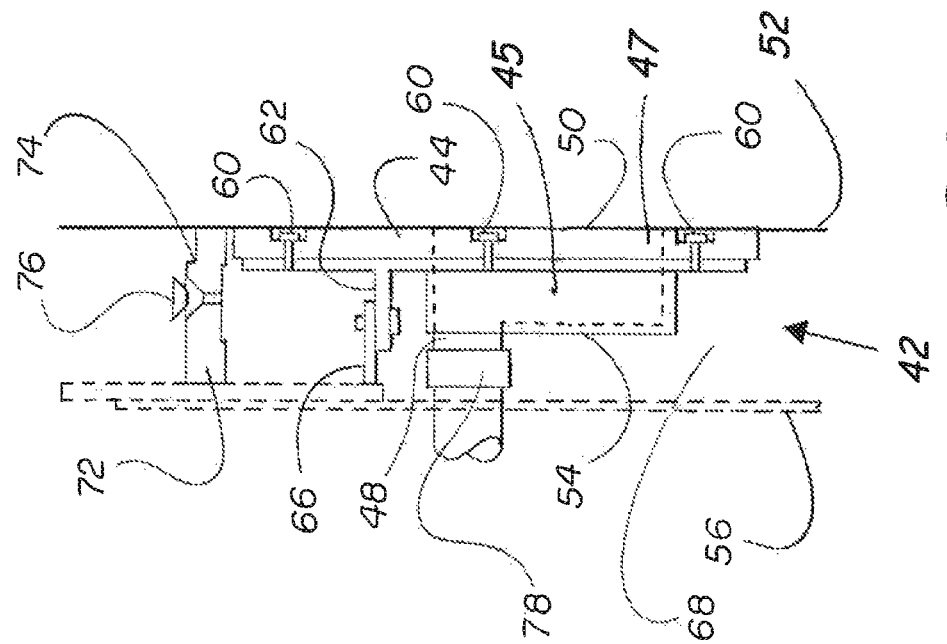
FIG. 5 is a schematic diagram showing a top view of the flat-face valve plate mounted to the housing of the rotary vacuum drum washer filter.

FIG. 5 is a top down view of the flat face valve 42 mounted to a vat wall 56 of the vacuum washer drum 32. The plate seat 44 is mounted to a back panel 54 of the plenum chamber 45. The plenum chamber is formed by the back panel and the plate seat. Bolts 60 fasten the plate seat 44 to the back panel 54.

A mounting bracket 62 extends from the plate seat 44 or the back panel 54, and attaches the flat face valve 42 to the vat wall 56. The vat wall 56 is part of the housing for the drum 40. The mounting bracket 62 is fastened to a matching bracket 66 on the inside surface of the vat wall 56. When bolted together, the brackets 62, 66, securely hold the flat face valve 42 and align the plate seat 44 with the openings 25 in the tube sheet 50. The brackets 62, 66 are configured, e.g. slidable with respect to each other, to adjust the distance between the front of the plate seat 44 and the tube sheet 50. The brackets 62, 66 may also be configured to position the flat-face valve to be parallel to the tube sheet and aligned with the outlets 25.

A narrow filtrate channel 68 is formed between the tube sheet 50 and the vat wall 56. Filtrate liquid flows from the outlets 25 and into the narrow filtrate channel 68. Filtrate from the filtrate channel 68 flows into the filtrate chamber 21 (FIG. 1), to the drop leg conduit 28 and to the filtrate collection tank 29 (FIG. 2). The flat face valve 42 may be housed within the narrow filtrate channel 68.

A conventional circumferential seal 70 forms a barrier extending around the perimeter of the narrow filtrate channel 68. The seal 70 prevents the filtrate liquid from leaking out of the filtrate channel 68 and prevents air from leaking into the channel 68. The seal 70 may include a stationary metal ring 72 attached to the vat wall 56 and a rotating metal ring 74 attached to the vacuum washer drum 32, such as to the outer perimeter of the tube sheet. A resilient ring seal 76 may fill an annular gap formed between the stationary and rotating metal rings 72, 74.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotary drum vacuum washer filter comprising:
   a housing including a vat configured to receive a slurry of a liquid and a fibrous cellulosic material;
   a rotating drum including a porous outer surface and drainage channels extending from the porous outer surface to an end of the drum, wherein the rotating drum sits within the vat and the drainage channels are arranged parallel to an axis of rotation of the drum in an annular array and include drainage outlets forming an annular array, wherein the drainage outlets face the end of the drum;
   a stationary filtrate chamber disposed at the end of the drum adjacent to and facing the annular array of drainage outlets, and
   a stationary flat face valve at least partially within the filtrate chamber, but not extending into the rotary drum, the flat face valve comprising:
   a plate seat including a front surface configured to be adjacent the drainage outlets, wherein the plate seat covers the drainage outlets during a portion of a rotation of the drainage outlets and does not cover the drainage outlets during a majority of the rotation of the drainage outlets;
   an opening on the plate seat extending through the front surface of the plate seat and aligned with the drainage outlets;
   a plenum chamber adjacent a back surface of the plate seat, wherein the plenum chamber is a chamber formed by an arc shaped box having a back wall, a sidewall extending from the perimeter of the back wall and an open front, wherein the edge of the sidewall abuts the plate seat, and wherein the opening provides a fluid passage from the drainage outlets, through the plate seat and into the plenum chamber, and
   a gas vent extending from an upper region of the plenum chamber to an external outlet.

2. The rotary drum vacuum washer filter as in claim 1 further comprising a liquid drain extending from the plenum chamber.

3. The rotary drum vacuum washer filter as in claim 1 wherein the plate seat has an arc shape in front view and the front surface is planar.

4. The rotary drum vacuum washer filter as in claim 1 further comprising a second opening in the plate seat and both openings are arranged in an arc shaped row.

5. The rotary drum vacuum washer filter as in claim 1 wherein the plate seat is configured to align with the drainage outlets as the outlets rotate through an arc between a 1:00 position and a 5:30 position.

6. The rotary drum vacuum washer filter as in claim 1, wherein the drainage outlets are arranged in a tube sheet attached to the end of the rotary drum and the front surface of the plate seat is parallel to the tube sheet.

* * * * *